| United States Patent [19] | [11] | 4,145,058 |
|---|---|---|
| Hady et al. | [45] | Mar. 20, 1979 |

[54] SHAFT SEAL ASSEMBLY FOR HIGH SPEED AND HIGH PRESSURE APPLICATIONS

[75] Inventors: William F. Hady, Cleveland Heights; Lawrence P. Ludwig, Fairview Park, both of Ohio

[73] Assignee: The United States of America as represented by the Administrator of the National Aeronautics and Space Administration, Washington, D.C.

[21] Appl. No.: 814,006

[22] Filed: Jul. 8, 1977

[51] Int. Cl.² ............................................... F16J 15/16
[52] U.S. Cl. ....................................... 277/62; 277/96.1
[58] Field of Search .................... 277/61, 62, 96, 96.1; 418/142

[56] References Cited

U.S. PATENT DOCUMENTS

| 2,888,286 | 5/1959 | Scheffler et al. | 277/193 |
| 3,009,717 | 11/1961 | Laser | 277/62 |
| 3,176,910 | 4/1965 | Bentele | 418/142 |
| 4,082,296 | 4/1978 | Stein | 277/96.1 |

Primary Examiner—Robert I. Smith
Attorney, Agent, or Firm—N. T. Musial; J. R. Manning; G. E. Shook

[57] ABSTRACT

A seal assembly is provided for reducing the escape of fluids from between a housing and a shaft rotatably mounted in the housing. The seal assembly comprises a pair of seal rings resiliently connected to each other and disposed in side-by-side relationship. In each seal ring, both the internal bore surface and the radial face which faces away from the other seal ring are provided with a plurality of equi-spaced recesses known as Rayleigh step pads. The seal faces referred to are located adjacent a seating surface of the housing. Under normal operating conditions, the seal assembly is stationary with respect to the housing, and the recesses generate lift, keep the assembly spaced from the rotating shaft and allow slip therebetween. Due to expansion of the shaft resulting from rubbing contact with the seal assembly, the seal assembly can seize on the shaft, and slip will then occur between the radial faces and the housing. The shaft will subsequently cool down due to the reduction or elimination of rubbing contact between the shaft and the seal assembly, and the seal assembly will heat up with resultant thermal expansion due to rubbing contact with the housing. As the seal assembly expands, slipping once again occurs between the seal assembly and the shaft. Thus, the seal ring assembly provides thermal stabilization. Preferably metallic bands are shrunk fit about each of the seal rings which are comprised of carbon graphite, so as to match the coefficient of expansion of a metallic shaft and the seal assembly.

13 Claims, 6 Drawing Figures

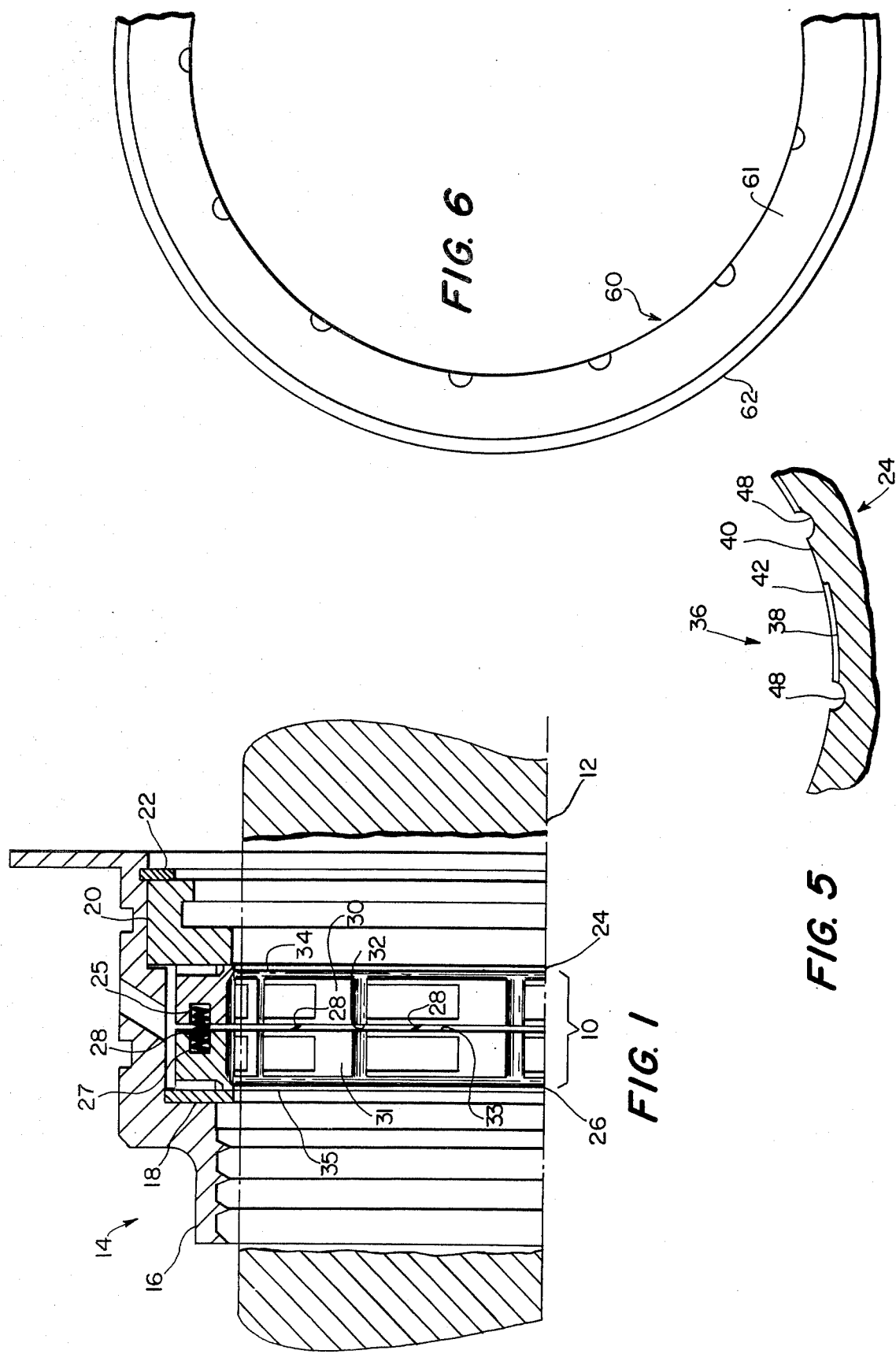

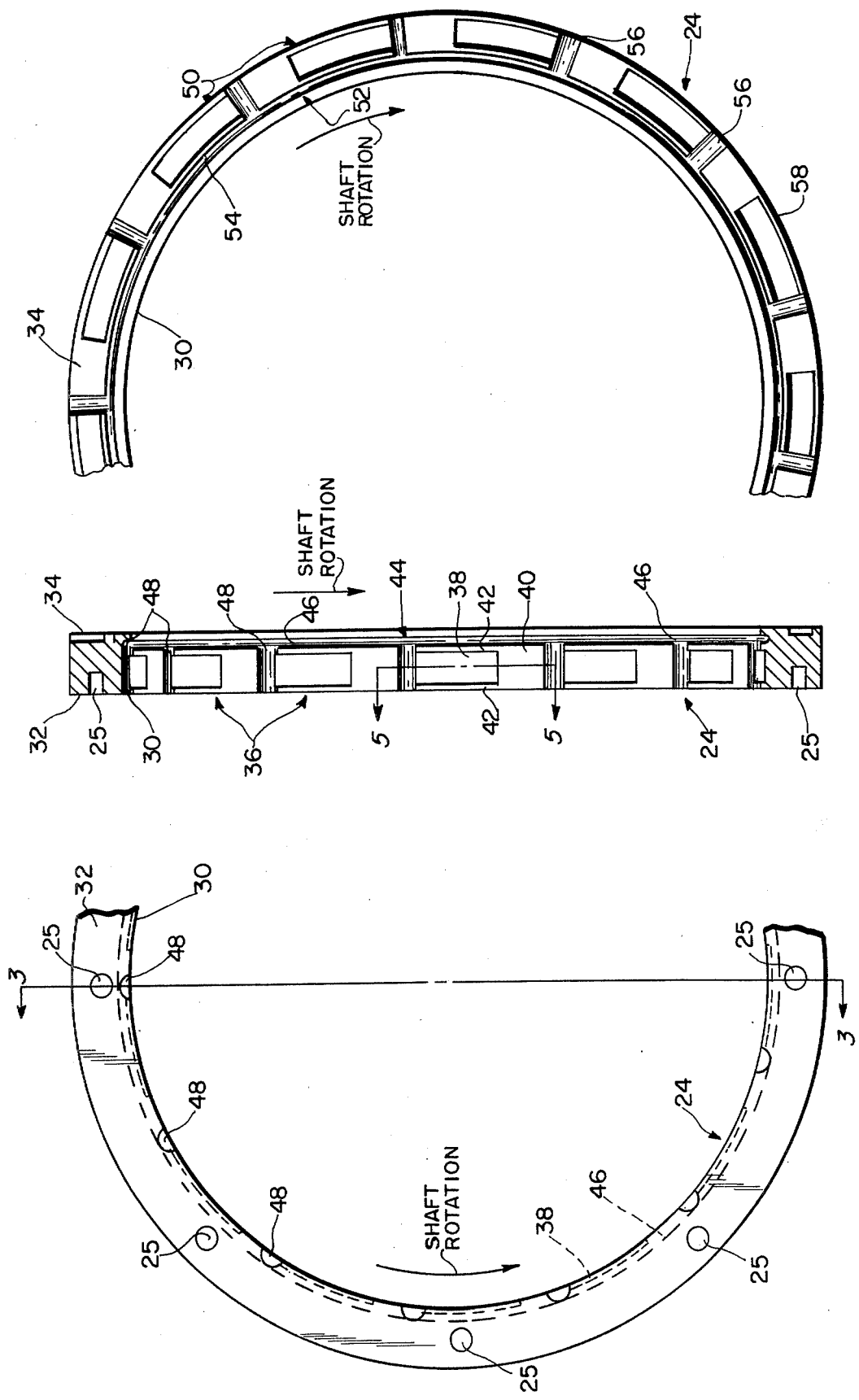

SHAFT SEAL ASSEMBLY FOR HIGH SPEED AND HIGH PRESSURE APPLICATIONS

ORIGIN OF THE INVENTION

The invention described herein was made by employees of the United States Government and may be manufactured or used by or for the Government without the payment of any royalties thereon or therefor.

BACKGROUND OF THE INVENTION

1. Field of the Invention

This invention relates to circumferential shaft seals and, in particular, to shaft seals for high speed and high pressure applications.

2. Description of the Prior Art

Considerable effort has been spent in the development of seals for high speed and high pressure applications. Conventional contact seals cannot meet the ever increasing pressure, temperature, and speed requirements of modern rotating equipment because of thermal, wear, and eventual leakage problems associated with these seals. As an example, in advanced aircraft gas turbine operation, shaft speeds are expected to reach 183 meters per second (600 ft/sec.), with pressures of 345 Newtons per square centimeter (500 psi).

One approach to dealing with these severe operating conditions is to use clearance seals such as labyrinth seals. These seals are reliable, but carry performance penalties due to high leakage rates. Such leakage is highly undesirable where, for example, turbine fuel or rocket propellant due to weight and volume limitations is at a premium.

Another approach is used with advanced industrial compressors, wherein pressures up to 3450 newtons per square centimeters (5000 psi) are being considered. The sealing system for these high pressures is usually a liquid buffer bushing that requires a high pressure pump and electric drive motor and, for fail-safe reasons, a backup pump and motor. These compressor sealing systems, with their attendant plumbing and controls, take up considerable space and can cost as much as the compressor. Thus, there is a need for reliable, low leakage shaft seals that require no external controls or equipment and that can operate at the pressures, temperatures and speeds of advanced machines.

Recent studies have indicated that this need can be fulfilled with self-acting seals that provide lift which separates or spaces the seals apart from a rotating shaft, or from the housing in which the shaft is mounted. Such seals include a plurality of recesses located on the sealing surface of the seal. Two such seals are disclosed in U.S. Pat. No. 3,640,541 (Taschenberg) and 3,606,349 (Petrice et. al.). Other self-acting seals are disclosed in a NASA TECHNICAL MEMORANDUM (NASA TM X-68214) entitled "Self-Acting And Hydrodynamic Shaft Seals" by Lawrence P. Ludwig, one of the present applicants, which Technical Memorandum is hereby incorporated by reference. This Technical Memorandum discusses the use of self-acting seals (also referred to as lift-pads, Rayleigh step pads, and Rayleigh step bearings) on the radial face or the internal bore surface of a seal ring to produce a thrust bearing action which forces the seal ring away from the shaft or the housing.

Conventional contact seals, referred to hereinabove, often operate with a separation between the shaft and the internal bore surface of the seal due to forces produced by a self-acting effect, which is also referred to as a lift, a hydrodynamic or a pneumostatic effect. In these seals, the sealing and self-acting bearing functions are performed by the same surface, the self-acting bearing function being produced by seal surface waviness caused by local thermal expansion and wear. This dual performance is speed limited, as the heat generated in shearing of the lubricating fluid film causes fluid vaporization which degrades the self-acting bearing action. In contrast to this, seals which include the aforementioned recesses provide separation of the bearing and sealing functions, thereby allowing operation at higher temperatures.

Additional background information relating to, among other things, seal leakage, can be found in NASA Technical Note (NASA TN D-8151) entitled "Fundamentals of Fluid Sealing" by John Zuk, which Technical Note is incorporated herein by reference.

SUMMARY OF THE INVENTION

In accordance with the present invention, a seal assembly is provided that overcomes the disadvantages associated with the prior art. According to a preferred embodiment of the invention, there is provided a seal assembly, for reducing the escape of fluids from between a housing and a shaft rotatably mounted in the housing, which comprises a pair of seal rings resiliently connected to each other and disposed in side-by-side relationship around the shaft. Each seal ring has an internal bore surface provided with a plurality of spaced recesses for channeling fluid toward the shaft. Further, the oppositely facing radial faces of the seal rings, which are each located adjacent to a seating surface of the housing, are also provided with a plurality of spaced recesses for channeling fluid toward the adjacent seating surface.

A further aspect of the invention concerns the provision of a fluid feed arrangement for providing fluid to the plurality of recesses in the internal bore surfaces and in the oppositely facing radial faces.

Although the seal assembly is free to rotate about the shaft, under normal operating conditions the seal assembly is stationary with respect to the housing and the recesses function to generate lift so as to keep the assembly spaced from the rotating shaft and allow slip therebetween. Should the seal assembly seize on the shaft due to thermal expansion of the shaft caused by rubbing contact with the seal assembly, slip will occur between the oppositely facing radial faces and the housing. The shaft will then cool down due to the reduction or elimination of rubbing contact between the shaft and the seal assembly, and the seal assembly will heat up with resultant thermal expansion due to rubbing contact with the housing. As the seal assembly expands, slipping once again occurs between the seal assembly and the shaft. It will be appreciated from the foregoing that the seal assembly of the invention can be successfully used in a high temperature environment because of the self-stabilized operation thereof when thermally induced seizure occurs.

According to a further feature of the invention a band is fitted about the outer diametrical surface of the seal ring so that the coefficient of expansion of the shaft matches that of the seal ring.

Additional features and advantages of the invention will be set forth in, or apparent from, the detailed description of a preferred embodiment found hereinbelow.

BRIEF DESCRIPTION OF THE DRAWINGS

FIG. 1 depicts one-half of a symmetrical, cross-sectional view of the seal assembly of the invention as mounted in a housing;

FIG. 2 depicts an enlarged portion of the inwardly facing radial face of one of the seal rings of the seal assembly of FIG. 1;

FIG. 3 depicts a cross-sectional view taken through line 3—3 in FIG. 2;

FIG. 4 depicts a portion of the oppositely facing radial face, or back face, of the seal ring of FIG. 2;

FIG. 5 depicts a portion of a cross-sectional view taken through line 5—5 in FIG. 3; and FIG. 6 is a side elevational view, partially broken away, of another embodiment of a seal ring of the invention with a band fitted about the outer diametrical surface.

DETAILED DESCRIPTION OF THE PREFERRED EMBODIMENT

With reference to the drawings, and in particular to FIG. 1, there is depicted a seal assembly of the invention, which is generally denoted 10. Seal assembly 10 is mounted on a shaft 12 (only a portion of which is depicted in FIG. 1 so as not to obstruct a view of seal assembly 10) and is freely rotatable thereabout. Seal assembly 10 and shaft 12 are retained in a housing generally denoted 14 and are freely rotatable therein.

Before describing seal assembly 10 more fully, a short description of housing 14 will be presented. Housing 14 includes an outer cylindrical casing 16. Bearing surfaces for seal assembly 10 are provided by retaining rings 18 and 20. In a preferred embodiment retaining rings 18 and 20 are force fit, or interference fit, into casing 16. According to this procedure, retaining ring 18 is positioned adjacent a shoulder machined into cylindrical casing 16, seal assembly 10 is positioned adjacent retaining ring 18 and then retaining ring 20 is positioned, as shown. An o-ring 22 fits into a slot in casing 16, so as to hold retaining ring 20 in casing 16.

The seal assembly 10 includes a pair of seal rings 24 and 26 which are disposed within housing 14 in side-by-side relationship and are resiliently connected together by a plurality of springs 28. Seal rings 24 and 26 include internal bore surfaces 30 and 31 respectively, inwardly facing radial faces 32 and 33 respectively, and oppositely facing radial faces 34 and 35, which faces 34 and 35 are known in the trade as, and referred to hereinbelow as, back faces. Springs 28 are equally spaced circumferentially about rings 24, 26 and extend parallel to the axis of rotation of shaft 12, between faces 32 and 33 of rings 24, 26. The opposite ends of springs 28 are received in opposed bores 25, 27 of rings 24, 26. Seal rings 24 and 26 are identical in construction except that seal ring 26 is the "mirror image" of seal ring 24. In a preferred embodiment, the internal radius of each ring is about 0.002 inch. to about 0.003 inch greater than the radius of shaft 12.

Referring to FIGS. 2, 3, 4 and 5, additional views of one of the seal rings, ring 24, are shown. Of course, the following description of seal ring 24 applies to seal ring 26 apart from the difference noted hereinabove. Machined into internal bore surface 30 are a plurality of equi-spaced Rayleigh step bearings which are collectively denoted 36 and which can also be referred to as lift-pads or Rayleigh step pads. Following bearing terminology, these terms are generally used to describe seals for compressible fluids, the terms such as hydrodynamic and hydrostatic being reserved for seals for incompressible fluids. However, it is to be noted that although this terminology is used, seal assembly 10 of the invention as described herein can be operated in either an environment comprising incomprssible or compressible fluid.

As can best be seen in FIGS. 3 and 5, Rayleigh step bearings 36 include, in a preferred embodiment, a generally rectangular-shaped recess 38 bordered on one of the short sides thereof by a rectangularly shaped portion of internal bore surface 30, referred to as a back land or step 40. Recess 38 is bordered along the two long sides thereof by an elongate portion of bore surface 30, referred to as elongate side lands 42. In a preferred embodiment, recess 38 is machined to a depth of 0.001 inch below the internal bore surface. However, it is to be noted that Rayleigh step bearings 36 can comprise other designs that include land and recess configurations such as disclosed in, for example, the prior art referred to above.

In FIGS. 2, 3, and 4, arrows are drawn to indicate the direction of rotation of shaft 12. Referring to FIG. 3 it is evident that the short edge of recess 38, opposite the shortened edge bordered by land 40, is the first portion of each Rayleigh step bearing 36 to come into an operational relationship with shaft 12.

Also machined into internal bore surface 30 (FIG. 3) is a fluid feed arrangement (also referred to as a sealing dam), which is generally denoted 44. Fluid feed arrangement 44 includes a circumferential channel 46, extending continuously along, and machined into, internal bore surface 30 adjacent to back face 34. Feed arrangement 44 also includes a plurality of transverse channels 48 machined into surface 30. The transverse channels 48 extend generally orthonormally to the left of, and are in fluid communication with, circumferential channel 46. Transverse channels 48 extend into fluid communication with inwardly facing radial face 32. Each transverse channel 48 is positioned between the back land of one Rayleigh step bearing and the shortened edge of the recess of next adjacent Rayleigh step bearing, and is in fluid communication with the aforementioned recess. In a preferred embodiment channels 46 and 48 are machined to a depth of from 0.040 to 0.045 inch.

Referring to FIG. 4, a plurality of Rayleigh step bearings 50 are depicted on back face 34. Rayleigh step bearings 50 are similar in design and construction to Rayleigh step bearings 36. Also machined into back face 34 is a fluid feed arrangement generally denoted 52 that is similar to fluid feed arrangement 44. Fluid feed arrangement 52 includes a circumferential channel 54 machined into back face 34 so as to be adjacent internal bore surface 30. Extending from, and in fluid communication with, circumferential channel 54 are a plurality of radial channels 56. Radial channels 56 extend between Rayleigh Step bearings 50 into fluid communication with outer diametrical surface 58 of sealing 24.

In a preferred embodiment seal rings 24 and 26 are composed of carbon graphite and in particular graphitar USG G67 or the equivalent. However, it is to be understood that other materials can be used for seal rings 24 and 26.

The operation of seal assembly 10 is as follows: Generally seal assembly 10 remains stationary with respect to housing 14. Thus relative velocity or slip occurs between shaft 12 and internal bore surfaces 30 and 31 of each seal ring. No slip occurs between the back faces 34 and 35, and housing 14, because springs 28 force the seal rings 24, 26 against retaining rings 18 and 20 of housing 14.

When the internal bore surface of one or both of the seal rings seizes on shaft 12 due to, for example, thermal expansion of the shaft caused by rubbing contact with the internal bore surface, slip will begin to occur between the back faces 34 and 35 of rings 24, 26 and housing 14. Shaft 12 tends to cool because of the reduction or elimination of rubbing contact between shaft 12 and the internal bore surface 30 and 31, and seal assembly 10 heats up due to the rubbing contact between back faces 34 and 35 thereof and housing 14. Thus, seal assembly 10 expands due to the rubbing contact between the back faces 34 and 35, and housing 14, and slip can again occur between shaft 12 and the internal bore surface 30 and 31 of seal rings 24 and 26. Consequently, seal assembly 10 is stable against thermally induced seizure.

As shaft 12 rotates relative to seal rings 24 and 26, the Rayleigh step bearings located on the internal bore surface 30 and 31 of seal rings 24 and 26 create a lift force, or thrust bearing action that forces the seal rings away from shaft 12. This lifting force is produced as follows. The motion of the shaft relative to Rayleigh step bearings 36 draws fluid from the fluid feed arrangement 44 into the shallow recesses 38 of the Rayleigh step bearings 36. As the fluid is restricted from leaving the recess by back land 40 and side land 42, a lift force, or thrust bearing action, is produced wherein fluid is channeled by the aforementioned lands toward shaft 12, which channelized fluid urges seal assembly 10 apart from shaft 12. Further, it is to be noted that the Rayleigh step bearings and fluid feed arrangement machined into back faces 34 and 35 of seal rings 24 and 26 operate in a similar manner when the back faces 34 and 35 rotate relative to housing 14 due to the seizure of seal rings 24 and/or 26 on shaft 12. Thus, being spaced apart from rotating shaft 12 by the lifting force generated, seal assembly 10 can operate at higher shaft rotational speeds and higher pressures with less leakage than conventional contact or non-contact seals. Further, as the lifting force in effect causes seal assembly 10 to "float" about shaft 12, seal assembly 10 can operate at closer clearances than a non-contacting seal, as seal assembly 10 can move with shaft 12, should the position of shaft 12 deviate.

Seal assembly 10 can be used in, but are not limited to use in, the following environments: as a circumferential shaft seal for space shuttle main rocket engine turbopumps; as space tug turbopump seals; and as gas turbine mainshaft seals.

An alternate embodiment of a seal ring of the seal assembly of the invention is depicted in FIG. 6. Seal ring 60 in FIG. 6 comprises an inner ring 61, similar to seal ring 24 and 26 of the embodiment described hereinabove, and an outer ring, or metal band, 62 that is shrunk fit about inner ring 61. In a preferred embodiment metal band 62 has an outer diameter that is about 1.25 times as large as the outer diameter of inner ring 61. In another preferred embodiment, inner ring 61 is comprised of a carbon graphite, and seal ring 60 is designed so that the coefficient of expansion of the carbon graphite-metal composite of seal ring 60 matches the coefficient of expansion of the shaft about which seal ring 60 is mounted. This embodiment is thus adapted to control the expansion of seal ring 60 and permit operation at elevated temperatures.

In accordance with a further embodiment of the invention, a single seal ring corresponding to either seal ring 24 or 26, as disclosed hereinabove, is mounted in a housing such as housing 14 in FIG. 1. The seal ring of this embodiment includes spaced Rayleigh step bearings on the inner bore surface thereof and on one of the radial faces. An aspect of this embodiment is the inclusion of spaced Rayleigh step bearings on both radial faces. Such an embodiment can be provided by removing springs 28 of seal assembly 10 as depicted in FIG. 1 and then rigidly securing inwardly facing radial faces 32 and 33 of seal rings 24 and 26 together, in side-by-side relationship, to form a single ring with Rayleigh step bearings on the internal bore surface and both remaining radial faces. Further, the embodiment can also be provided with a shrunk fit, metallic band.

Although the present invention has been described relative to an exemplary embodiment thereof, modifications and variations can be effected in these embodiments without departing from the scope and spirit of the invention.

I claim:

1. In a seal assembly for reducing the escape of fluids from between a housing and a shaft rotatively mounted in the housing, means for providing stability against thermally induced seizure comprising
   a pair of seal rings within said housing mounted on the shaft for rubbbing contact therewith in side-by-side relationship and spaced from each other, said seal rings being normally stationary with respect to said housing as said shaft rotates,
   a pair of opposed seating surfaces on said housing, said seal rings being positioned between said seating surfaces,
   each seal ring having an internal bore surface including a plurality of spaced recesses for channeling fluid toward the shaft as the shaft rotates relative to the seal assembly thereby generating lift to maintain each seal ring spaced from said rotating shaft whereby said ring slips relative to said shaft and remains stationary with respect to said housing,
   said seal rings further comprising oppositely facing radial faces located adjacent to said seating surfaces of the housing and including a plurality of spaced recesses for channeling fluid toward the seating surfaces to generate lift as said seal rings rotate relative to said housing when said seal assembly seizes said shaft due to thermal expansion thereof into engagement with said internal bore, and
   spring means between said seal rings for biasing said oppositely facing radial faces into sealing engagement with said seating surfaces of said housing when said seal rings are stationary relative to said housing and resiliently securing said seal rings to each other thereby providing uniform rotation relative to said housing when said seal rings seize said shaft and substantially equal stoppage of said rotation resulting from thermal contraction of said shaft upon cooling the same.

2. A seal assembly in accordance with claim 1 wherein each seal ring includes a fluid feed arrangement for providing fluid to said plurality of recesses in said internal bore surfaces and to said recesses in said radial faces.

3. A seal assembly in accordance with claim 2 wherein each said fluid feed arrangement includes a circumferential channel recessed into said internal bore surface adjacent to a said radial face, and a plurality of transverse channels recessed into said internal bore surface and in fluid communication with said circumferential channel, one said transverse channel being in fluid communication with each of said recesses on said bore surface, and wherein each said fluid feed arrangement further includes a further circumferential channel recessed into a said radial face adjacent to said internal bore, and a plurality of radial channels recessed into said radial face and in fluid communication with said further circumferential channel, one said radial channel being in fluid communication with each of said recesses on said radial face.

4. A seal assembly in accordance with claim 2 wherein said seal rings are mounted for rotation in said housing and said fluid feed arrangement is in fluid communication with the leading portion of each said recess in said internal bore surface, which leading portion is the initial portion of each said recess to come into operational engagement with the shaft as the shaft rotates, and wherein said fluid feed arrangement is in fluid communication with the leading portion of each said recess in said radial face, which leading portion is the initial portion of each said recess along the direction of rotation of the shaft.

5. A seal assembly in accordance with claim 1 wherein said recesses are equi-spaced on each said internal bore surface and on each said radial face.

6. A seal assembly in accordance with claim 1 wherein each said recess is rectangular in shape.

7. A seal assembly in accordance with claim 6 wherein said seal rings are free to rotate about said shaft, wherein the longer sides of said rectangular recesses extend generally parallel to the direction of rotation of said seal rings, wherein said recesses are equi-spaced along said internal bore surfaces and said radial faces, and wherein said internal bore surfaces include lands located adjacent to the trailing portions of each of the recesses and said radial faces include lands located adjacent the trailing portion of each of the said recesses.

8. A seal assembly in accordance with claim 7 further including a fluid feed arrangement for feeding fluid to the leading edge of each rectangular recess, wherein said fluid feed arrangement for each said seal ring includes a first circumferential channel recessed into said internal bore surface of the said seal rings adjacent to the said radial face of the said seal ring and a plurality of transverse channels recessed into the said internal bore surface of the said seal rings, said transverse channels being in fluid communication with said first circumferential channel, and one of said transverse channels being in fluid communication with each said rectangular recess and each of said transverse channels extending between the leading edge of a said rectangular recess and the proceeding land, wherein said fluid feed arrangement for each seal ring further includes a second circumferential recess in the said radial face of the said seal ring adjacent to said internal bore surface, and a plurality of radial channels recessed into the said radial face of the said seal ring, said radial channels being in fluid communication with said second circumferential channel and one of said radial channels being in fluid communication with each said rectangular recess of the said radial face, each of said radial channels extending between the leading edge of one rectangular recess and the proceeding land.

9. A seal assembly in accordance with claim 1 wherein said seal rings comprise carbon graphite.

10. A seal assembly in accordance with claim 1 further including a band fitted to each seal ring.

11. A seal assembly in accordance with claim 1 wherein a metallic band is fitted to each seal ring, wherein said seal rings are comprised of carbon graphite and the shaft of metal, and wherein the coefficient of expansion of the shaft is substantially equivalent to the coefficient of expansion of said seal assembly.

12. A seal assembly in accordance with claim 1 wherein the radius to the internal bore surface of each ring is about 0.002 inch to about 0.003 inch greater than the radius of the shaft.

13. A seal assembly in accordance with claim 1 wherein each of said recesses is about 0.001 inch deep.

* * * * *